(12) United States Patent
Acocella et al.

(10) Patent No.: US 7,400,326 B1
(45) Date of Patent: Jul. 15, 2008

(54) SYSTEM AND METHOD FOR DELIVERING MULTIPLE DATA STREAMS VIA MULTIPLE BUSES

(75) Inventors: Dominic Acocella, Blainville (CA); Robert W. Gimby, West Bloomfield, MI (US); Thomas H. Kong, Los Altos, CA (US); Andrew D. Bowen, Austin, TX (US); Christopher J. Goodman, Round Rock, TX (US); David C. Tannenbaum, Austin, TX (US); Jeffrey B. Moskal, Austin, TX (US); Steven Gregory Foster, Jr., Sonora, CA (US)

(73) Assignee: NVIDIA Corporation, Santa Clara, CA (US)

( * ) Notice: Subject to any disclaimer, the term of this patent is extended or adjusted under 35 U.S.C. 154(b) by 367 days.

(21) Appl. No.: 10/944,483

(22) Filed: Sep. 16, 2004
(Under 37 CFR 1.47)

(51) Int. Cl.
*G06F 13/14* (2006.01)

(52) U.S. Cl. ....................... 345/520; 710/307

(58) Field of Classification Search ................. 345/520; 710/307; 370/364
See application file for complete search history.

(56) References Cited

U.S. PATENT DOCUMENTS 5,461,723 A * 10/1995 Shah et al. .................. 710/307
6,864,892 B2 * 3/2005 Lavelle et al. ............... 345/520

* cited by examiner

*Primary Examiner*—Jeffrey A. Brier
(74) *Attorney, Agent, or Firm*—Townsend and Townsend and Crew, LLP

(57) ABSTRACT

Systems and methods for delivering two data streams via two buses allow one of the buses to be used for delivering selected elements of the data stream that is primarily being delivered by the other bus. At an input rerouting circuit, the selected elements are rerouted from the second data stream into the first data stream; a token inserted in the second data stream identifies a position of the rerouted element. The modified streams are transmitted by the two buses. A receiving circuit reinserts the rerouted data element into the second data stream at the sequential position identified by the placeholder token.

17 Claims, 6 Drawing Sheets

| ... | SB1 | VTX1 | PRG1 | PRG2 | PRG3 | PRG4 | SB2 | SB3 | PRG4 | VTX2 | ... |

| ... | SB1 | PRIM1 | PRG1 | PRG2 | PRG3 | PRG4 | SB2 | SB3 | PRG4 | PRIM2 | ... |

| ... | VDAT1 | VDAT2 | VDAT3 | ... |

| ... | SB1 | PRIM1 SYNC | SB2 SYNC | PRG2 | PRG3 | SB3 SYNC | PRIM2 SYNC | ... |
| ... | SYNC VDAT1 | PRG1 | SYNC VDAT1 | | SYNC PRG3 | SYNC VDAT2 | SYNC PRG4 | VDAT3 |

| T1 | T2 | T3 | T4 | T5 | T6 | T7 | T8 | T9 | T10 |
|----|----|----|----|----|----|----|----|----|-----|
| ... | SB1 | PRIM1 | PRG1 | PRG2 | PRG3 | SB2 | SB3 | PRG4 | PRIM2 | ... |
| ... | VDAT1 | — | — | — | — | VDAT2 | — | — | VDAT3 |

SYSTEM AND METHOD FOR DELIVERING MULTIPLE DATA STREAMS VIA MULTIPLE BUSES

BACKGROUND OF THE INVENTION

The present invention relates in general to data transfer devices, and in particular to systems and methods for synchronizing data between two buses such that one bus can be used to deliver a portion of a data stream that is primarily being delivered by the other bus.

Graphics processors typically include a rendering pipeline made up of several sections, e.g., a front-end section, a vertex processing engine, a rasterizer, a fragment shader, and so on. The processor provides buses for transferring various data streams from one section of the pipeline to another. For example, in one common architecture, all rendering instructions and associated data are received as commands in a front-end processing section. In response to the instructions, the front-end section may fetch vertex data from system memory and generate a stream of state commands (also referred to herein as state bundles); the vertices and state commands are delivered to the vertex processing engine via one or more buses.

In general, the vertex data stream and the state commands stream have very different properties and are not required to be synchronized. For instance, a state command typically contains significantly fewer bits than a vertex. In addition, the state command stream may occasionally stall, e.g., if one of the commands requires flushing the vertex processing engine (or other rendering pipeline components); such command stream stalls do not need to affect the flow of vertex data into input buffers of the vertex processing engine. These considerations suggest providing separate buses for state commands and vertex data. The vertex bus is optimally wide enough (e.g., 128 bits) to transmit a vertex attribute on each clock cycle and includes little or no buffering; the state command bus is optimally narrower (e.g., 42-48 bits) with a relatively deep FIFO (first-in, first-out buffer circuit) to accommodate stalls in the state command stream.

In modern processors, the rendering pipeline often includes programmable components (e.g., vertex processing engine, fragment shader), and the need to deliver programs as well as other state commands to such components complicates the dual-bus design. The programs are, in effect, state commands that should be included in the state command stream so that they can be kept in order with respect to other state commands. Programs, however, are considerably wider than typical state commands (e.g., 128 bits), making them ill-suited for delivery via a narrow command bus. Making the command bus wide enough to transfer a program in a reasonable number of cycles will result in an increase in chip area due to the need for a FIFO that is both deep and wide. Since, in practice, programs comprise a relatively small fraction of state commands, much of the FIFO capacity would rarely be used, resulting in inefficiency.

Another option is to deliver both state commands and data via a single relatively wide (e.g., 128+48 bits) bus. While this option would result in more efficient use of the bus width, it can reduce overall throughput, as vertex data transfer would also stall whenever the state command stream stalls.

It would therefore be desirable to provide a data transfer mechanism for efficiently accommodating programs or other unusually wide state commands.

BRIEF SUMMARY OF THE INVENTION

Embodiments of the present invention provide systems and methods for allowing one of two buses to be used for delivering part of a data stream that is primarily being delivered by the other bus. For example, the first one of the buses may be a wide bus that delivers a first data stream made up of wide data elements, while the second bus is a narrow bus that delivers a second data stream made up largely of narrow data elements but also includes some data elements that are too wide for the second bus. The wide data elements can be rerouted onto the first bus, and such rerouted data is identified by synchronization tokens inserted into the first data stream together with the rerouted data for delivery by the first bus, and the point in the second data stream at which the rerouted data is to be re-inserted is identified by synchronization tokens inserted into the second data stream for delivery by the second bus. At the receiving side of the bus, the synchronization tokens are used to detect the rerouted data in the first data stream and to reinsert the rerouted data at the appropriate point in the second data stream. The systems and methods described herein are usable in a variety of processors, including graphics processing units that may be incorporated into a variety of computer systems.

According to one aspect of the present invention, a device is provided for transferring a first data stream having first data elements and a second data stream having second data elements to a first data path and a second data path, respectively. The device includes an input rerouting circuit, a first bus, a second bus, and a receiving circuit. The input rerouting circuit is configured to modify the first and second data streams by rerouting one of the second data elements from the second data stream into the first data stream and inserting a placeholder token into the second data stream, the placeholder token identifying a sequential position of the rerouted data element. The first bus is coupled to the input rerouting circuit and configured to transfer to a destination node the modified first data stream including the rerouted data element. The second bus is coupled to the input rerouting circuit and configured to transfer to a destination node the modified second data stream including the placeholder token. The receiving circuit is coupled to the respective destination nodes of the first bus and the second bus and is configured to reinsert the rerouted data element from the modified first data stream into the modified second data stream at the sequential position identified by the placeholder token and to deliver the first data stream to the first data path and the second data stream, including the rerouted data element, to the second data path.

In some embodiments, the first bus has a first width, the second bus has a second width less than the first width, and the rerouted data element has a third width, the third width being greater than the second width.

In some embodiments, the input rerouting circuit is further configured to insert a rerouting token into the first data stream, the rerouting token identifying a location of the rerouted data element within the modified first data stream. The rerouting token and placeholder token may take various forms. For example, the placeholder token may be appended (e.g., as one or more extra bits) to one of the second data elements in the second data stream that is sequentially adjacent to the rerouted data element. Similarly, the rerouting token may be appended to a data element in the modified first data stream that is sequentially adjacent to the rerouted data element.

According to another aspect of the present invention, a method is provided for transferring a first data stream having first data elements and a second data stream having second data elements from a source device to a receiving device. At the source device, the first data stream and the second data stream are modified by rerouting one of the second data elements from the second data stream into the first data stream and inserting into the second data stream a placeholder token identifying a sequential position of the rerouted data element. The modified first data stream is transferred on a first bus from the source device to the receiving device, and the modified second data stream is transferred on a second bus from the source device to the receiving device. At the receiving device, the rerouted data element from the modified first data stream is reinserted into the modified second data stream at the sequential position indicated by the placeholder token.

In one embodiment, reinserting the rerouted data element can be done by a process in which data elements received from the first bus are routed into a first data path and data elements received from the second bus are concurrently routed into a second data path. A first synchronizing token is detected; this token may be either of the placeholder token on the second bus or the begin rerouting token on the first bus. Subsequently to detecting the first synchronizing token, the routing of data elements from the bus on which the first synchronizing token was detected is paused, while routing of data elements from the other bus continues. Then a second synchronizing token is detected; this is the other of the placeholder token on the second bus or the begin rerouting token on the first bus. Subsequently to detecting the second synchronizing token, data elements from the first bus are routed into the second data path while data elements from the second bus are held for later delivery.

According to yet another aspect of the present invention, an interface module for delivering state commands and vertex data to a graphics processor includes an input circuit and a data transfer circuit. The input circuit is coupled to receive an input stream and to generate a vertex stream and a state command stream in response to the input stream, where the state command stream includes at least one wide command (such as a program or a portion of a program) and at least one other command. The data transfer circuit, which includes a data bus and a command bus, is coupled to transfer the vertex stream from the input circuit to a vertex buffer of the graphics processor and to transfer the state command stream from the input circuit to a state command processor of the graphics processor, with the vertex stream and the wide command being transferred via the data bus and the other state command being transferred via the command bus.

In one embodiment, the data transfer circuit may include a rerouting circuit configured to modify the vertex stream and the state command stream by rerouting the wide command from the state command stream into the vertex stream and inserting a placeholder token into the state command stream, the placeholder token identifying a sequential position of the rerouted wide command. The modified vertex stream is then transferred on the data bus, and the modified state command stream is transferred on the command bus. The data transfer circuit may also include a receiving circuit coupled to receive data from the data bus and the command bus. The receiving circuit can be configured to reinsert the rerouted wide command from the modified vertex stream into the modified command stream at the sequential position identified by the placeholder token and to deliver the vertex stream to the vertex buffer and the command stream, including the rerouted wide command, to the state command processor.

The following detailed description together with the accompanying drawings will provide a better understanding of the nature and advantages of the present invention.

BRIEF DESCRIPTION OF THE DRAWINGS

FIGS. 6A-E illustrate command and data sequences that might occur during rerouting and reinsertion of programs according to an embodiment of the present invention.

DETAILED DESCRIPTION OF THE INVENTION

Specific systems and methods will now be described for synchronizing data streams between two buses and allowing one bus to deliver data elements to the data stream that is primarily carried on the other bus. The various techniques described herein are usable in a variety of processors, including graphics processing units that may be incorporated into a variety of computer systems.

Figure 1:
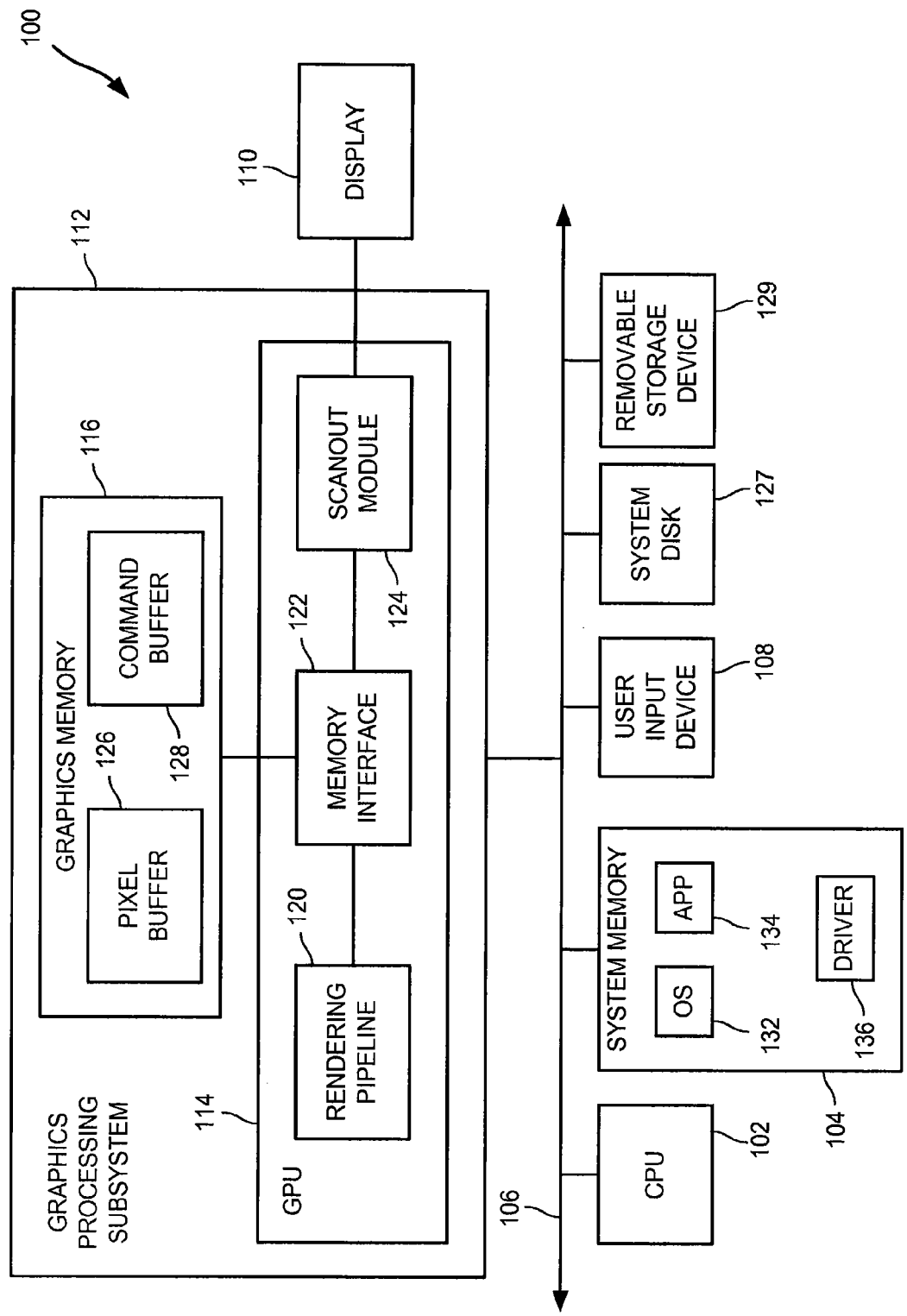
FIG. 1 is a block diagram of a computer system according to an embodiment of the present invention.

One context in which an embodiment of the present invention might be employed is shown in FIG. 1, which is a block diagram of a computer system 100 according to an embodiment of the present invention. Computer system 100 includes a central processing unit (CPU) 102 and a system memory 104 communicating via a bus 106. User input is received from one or more user input devices 108 (e.g., keyboard, mouse) coupled to bus 106. Visual output is provided on a pixel based display device 110 (e.g., a conventional CRT or LCD based monitor) operating under control of a graphics processing subsystem 112 coupled to system bus 106. A system disk 127 and other components, such as one or more removable storage devices 129 (e.g., floppy disk drive, compact disk (CD) drive, and/or DVD drive), may also be coupled to system bus 106. System bus 106 may be implemented using one or more of various bus protocols including PCI (Peripheral Component Interconnect), AGP (Advanced Graphics Processing) and/or PCI-Express (PCI-E); appropriate "bridge" chips such as a north bridge and south bridge (not shown) may be provided to interconnect various components and/or buses.

Graphics processing subsystem 112 includes a graphics processing unit (GPU) 114 and a graphics memory 116, which may be implemented, e.g., using one or more integrated circuit devices such as programmable processors, application specific integrated circuits (ASICs), and memory devices. GPU 114 includes a rendering pipeline 120, a memory interface module 122, and a scanout module 124. Rendering pipeline 120 may be configured to generate pixel data from 2-D or 3-D scene data provided by various programs executing on CPU 102; an example of rendering pipeline 120 is described below.

Memory interface module 122, which communicates with rendering pipeline 120 and scanout control logic 124, manages all interactions with graphics memory 116. Memory interface module 122 may also include pathways for writing pixel data received from system bus 106 to graphics memory 116 without processing by rendering pipeline 120. The particular configuration of memory interface module 122 may be varied as desired, and a detailed description is omitted as not being critical to understanding the present invention.

Graphics memory 116, which may be implemented using one or more integrated circuit memory devices of generally conventional design, may contain various physical or logical subdivisions, such as a pixel buffer 126 and a command buffer 128. Pixel buffer 126 stores pixel data for an image (or for a part of an image) that is read and processed by scanout control logic 124 and transmitted to display device 110 for display. This pixel data may be generated, e.g., from 2D or 3D scene data provided to rendering pipeline 120 of GPU 114 via system bus 106 or generated by various processes executing on CPU 102 and provided to pixel buffer 126 via system bus 106. Command buffer 128 is used to queue commands received via system bus 106 for execution by rendering pipeline 120 and/or scanout module 124, as described below. Other portions of graphics memory 116 may be used to store data required by GPU 114 (such as texture data, color lookup tables, etc.), executable program code for GPU 114 and so on.

Scanout module 124, which may be integrated in a single chip with GPU 114 or implemented in a separate chip, reads pixel color data from pixel buffer 126 and transfers the data to display device 110 to be displayed. In one embodiment, scanout module 124 operates isochronously, scanning out frames of pixel data at a prescribed screen refresh rate (e.g., 80 Hz) regardless of any other activity that may be occurring in GPU 114 or elsewhere in system 100. The particular configuration of scanout module 124 may be varied as desired, and a detailed description is omitted as not being critical to understanding the present invention.

During operation of system 100, CPU 102 executes various programs that are (temporarily) resident in system memory 104. In one embodiment, these programs include one or more operating system (OS) programs 132, one or more application programs 134, and one or more driver programs 136 for graphics processing subsystem 112. It is to be understood that, although these programs are shown as residing in system memory 104, the invention is not limited to any particular mechanism for supplying program instructions for execution by CPU 102. For instance, at any given time some or all of the program instructions for any of these programs may be present within CPU 102 (e.g., in an on-chip instruction cache and/or various buffers and registers), in a page file or memory mapped file on system disk 127, and/or in other storage space.

Operating system programs 132 and/or application programs 134 may be of conventional design. An application program 134 may be, for instance, a video game program that generates graphics data and invokes appropriate rendering functions of GPU 114 (e.g., rendering pipeline 120) to transform the graphics data to pixel data. Another application program 134 may generate pixel data and provide the pixel data to graphics processing subsystem 112 for display. It is to be understood that any number of application programs that generate pixel and/or graphics data may be executing concurrently on CPU 102. Operating system programs 132 (e.g., the Graphical Device Interface (GDI) component of the Microsoft Windows operating system) may also generate pixel and/or graphics data to be processed by graphics processing subsystem 112.

Driver program 136 enables communication with graphics processing subsystem 112, including both rendering pipeline 120 and scanout module 124. Driver program 136 advantageously implements one or more standard application program interfaces (APIs), such as OpenGL, Microsoft DirectX, or D3D for communication with graphics processing subsystem 112; any number or combination of APIs may be supported, and in some embodiments separate driver programs 136 are provided to implement different APIs. By invoking appropriate API function calls, operating system programs 132 and/or application programs 134 are able to instruct driver program 136 to transfer geometry data or pixel data to graphics processing subsystem 112 via system bus 106, to control operations of rendering pipeline 120 and/or scanout module 124, and so on. The specific commands and/or data transmitted to graphics processing subsystem 112 by driver program 136 in response to an API function call may vary depending on the implementation of GPU 114, as is known in the art.

In some embodiments, command buffer 128 queues the commands received via system bus 106 for execution by GPU 114. More specifically, driver program 136 may write a command stream to command buffer 128; the stream may include rendering commands and data for rendering pipeline 120 as well as state commands for scanout module 124. In some embodiments, command buffer 128 may include logically or physically separate sections for commands directed to rendering pipeline 120 and commands directed to scanout module 124; in other embodiments, the commands may be intermixed in command buffer 128 and directed to the appropriate pipeline by suitable control circuitry within GPU 114.

Command buffer 128 (or each section thereof) is advantageously implemented as a first in, first out buffer (FIFO) that is written by CPU 102 and read by GPU 114. Reading and writing can occur asynchronously, and provided that CPU 102 stays sufficiently far ahead of GPU 114, GPU 114 is able to render images without incurring idle time waiting for CPU 102. For instance, in some embodiments, depending on the size of the command buffer and the complexity of a scene, CPU 102 may write commands and data sets for frames several frames ahead of a frame being rendered by GPU 114. Command buffer 128 may be of fixed size (e.g., 5 megabytes) and may be written and read in a wraparound fashion as is known in the art.

It will be appreciated that the system described herein is illustrative and that variations and modifications are possible. A GPU may be implemented using any suitable technologies, e.g., as one or more integrated circuit devices. The GPU may be mounted on an expansion card that may include one or more such processors, mounted directly on a system motherboard, or integrated into a system chipset component (e.g., into the north bridge chip of one commonly used PC system architecture). The graphics processing subsystem may include any amount of dedicated graphics memory (some implementations may have no dedicated graphics memory) and may use system memory and dedicated graphics memory in any combination. In particular, the pixel buffer may be implemented in dedicated graphics memory or system memory as desired. The scanout circuitry may be integrated with a GPU or provided on a separate chip and may be implemented, e.g., using one or more ASICs, programmable processor elements, other integrated circuit technologies, or any combination thereof. In addition, the GPU may be incorporated into a variety of devices, including general purpose computer systems, video game consoles and other special purpose computer systems, DVD players, and the like.

Figure 2:
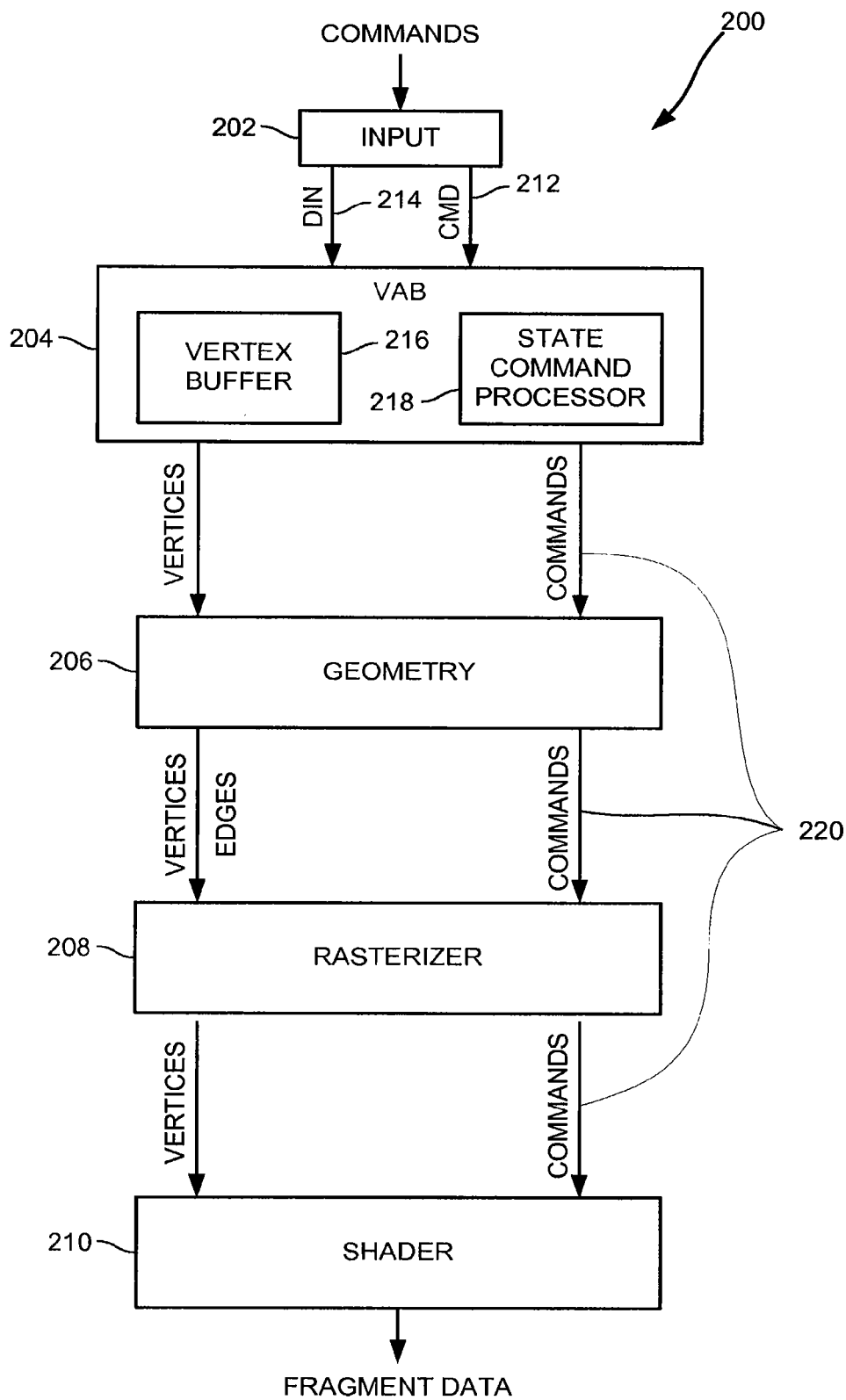
FIG. 2 is a simplified block diagram of a rendering pipeline according to an embodiment of the present invention.

FIG. 2 is a simplified block diagram of a rendering pipeline 200 according to an embodiment of the present invention. Rendering pipeline 200 may be implemented, e.g., as rendering pipeline 120 of GPU 114 described above. Rendering pipeline 200 includes an input module 202, a vertex assembly buffer 204, and downstream components such as a geometry block 206, a rasterizer 208, and a shader 210.

Input module 202 receives commands and associated data for rendering pipeline 200, e.g., from command buffer 128 described above. In response to the received commands, input module 202 generates a state command stream on a command (CMD) bus 212 and a vertex data stream on a data input (DIN) bus 214. Vertex assembly buffer 204 receives the respective data streams from CMD bus 212 and DIN bus 214. Vertex data on DIN bus 214 is directed to vertex buffers 216, and state commands on CMD bus 212 are directed to a state command processor 218.

In accordance with an embodiment of the present invention, the state commands generated by input module 202 also include programs for various downstream components of pipeline 200. Input module 202 advantageously directs (reroutes) these programs onto DIN bus 214 rather than CMD bus 212; the rerouted programs are inserted into the vertex data stream between vertices. The rerouted programs are later re-inserted into the command stream as described below.

To enable the programs to be reinserted at the correct sequential point in the command stream, input module 202 also inserts synchronization (sync) tokens into both the data stream on DIN bus 214 and the command stream on CMD bus 212. Sync tokens are inserted into the data stream on DIN bus 214 to delimit the rerouted program and into the command stream on CMD bus 212 to indicate the position in the command stream where a rerouted program from DIN bus 214 is to be reinserted. These aspects of input circuit 202 are described further below.

Vertex assembly buffer 204 includes a number of vertex buffers 216 and a state command processor 218. Vertex buffers 216 are used for storing vertices received via DIN bus 214 during vertex processing by downstream components. Any number of vertex buffers 216 may be provided, with each buffer storing one or more vertices. Vertex buffers 216 are advantageously addressable so that downstream components may access any vertex stored therein in any order and so that new vertices may be added to any location in vertex buffers 216.

State command processor 218 is advantageously configured to execute state commands in order of receipt. Execution of state commands may include e.g., modifying a parameter value in a register, dispatching programs or program instructions to a programmable component of rendering pipeline 200, and so on. In some embodiments, state command processors may be present in several different components of pipeline 200, and any state command processor may take action in response to some state commands and forward other state commands without acting on them. Once a state command processor has executed a given command, it may forward the command to a downstream state command processor or discard the command as appropriate. State command processor 218 may include buffering capacity for one or more commands if desired. It is to be understood that the configuration of vertex buffers 216 and/or state command processor 218 may be varied as desired, and a detailed description is omitted as not being critical to understanding the present invention.

Vertex assembly buffer 204 routes vertex data to vertex buffers 216 and state commands (including programs received via DIN bus 214) to state command processor 218. Accordingly, vertex assembly buffer 204 is advantageously configured to detect the sync tokens on CMD bus 212 and DIN bus 214 and to use the sync tokens to control re-insertion of programs into the command stream.

The downstream components of pipeline 200 obtain vertex data from vertex buffers 216 and commands from state command processor 218 and process the vertex data in accordance with the state commands, including any programs, to render an image. These components may be of generally conventional design.

For example, in one embodiment, the downstream components include a geometry block 206, which can include a vertex processing engine for performing various transformations on the vertex data, such as lighting transforms, modeling transforms, viewing transforms and the like. Numerous examples of such per-vertex transformation operations are known in the art and a detailed description is omitted as not being critical to understanding the present invention. Geometry block 206 may also include a viewport and culling engine that performs additional functions, such as determining the visible region of the viewing space, converting vertices to screen coordinates, culling and/or clipping any primitives that are wholly or partially outside the visible region, and the like. A setup engine may also be provided for generating edge equations for primitives to facilitate rasterization. Any or all elements of geometry block 206 may be configurable or programmable via state commands or programs propagated from state command processor 218 via a command path 220 that propagates state commands to each component of rendering pipeline 200.

Rasterizer 208 receives vertices and edge equations from geometry block 206 and performs scan-conversion of the received primitives using edge equations or other parameters of the primitives. Scan conversion generally involves defining an array of fragments covering the screen area and determining which primitive is visible at each fragment location; conventional scan-conversion algorithms may be used. Rasterizer 208 may be configurable via command path 220 to perform a variety of scan-conversion algorithms, change the fragment array dimensions or fragment size, and so on.

Shader 210 uses the coverage information (e.g., vertices of the visible primitive at each fragment location) generated by rasterizer 208 to compute a color for each fragment. Shader 210 may implement a variety of shading algorithms, including well-known algorithms such as Gouraud shading, Phong shading, texture blending, and the like. In some embodiments, shader 210 may also be configurable or programmable via command path 220.

It will be appreciated that the rendering pipeline described herein is illustrative and that variations and modifications are possible. A rendering pipeline may include any number of components configured for any processing operation that may be performed on vertex and/or fragment data. Particular data structures and widths may be varied, and data and/or commands may be transmitted in any format. Any state command in the command path may be acted upon by some or all components of the pipeline and ignored by the rest.

Figure 3:
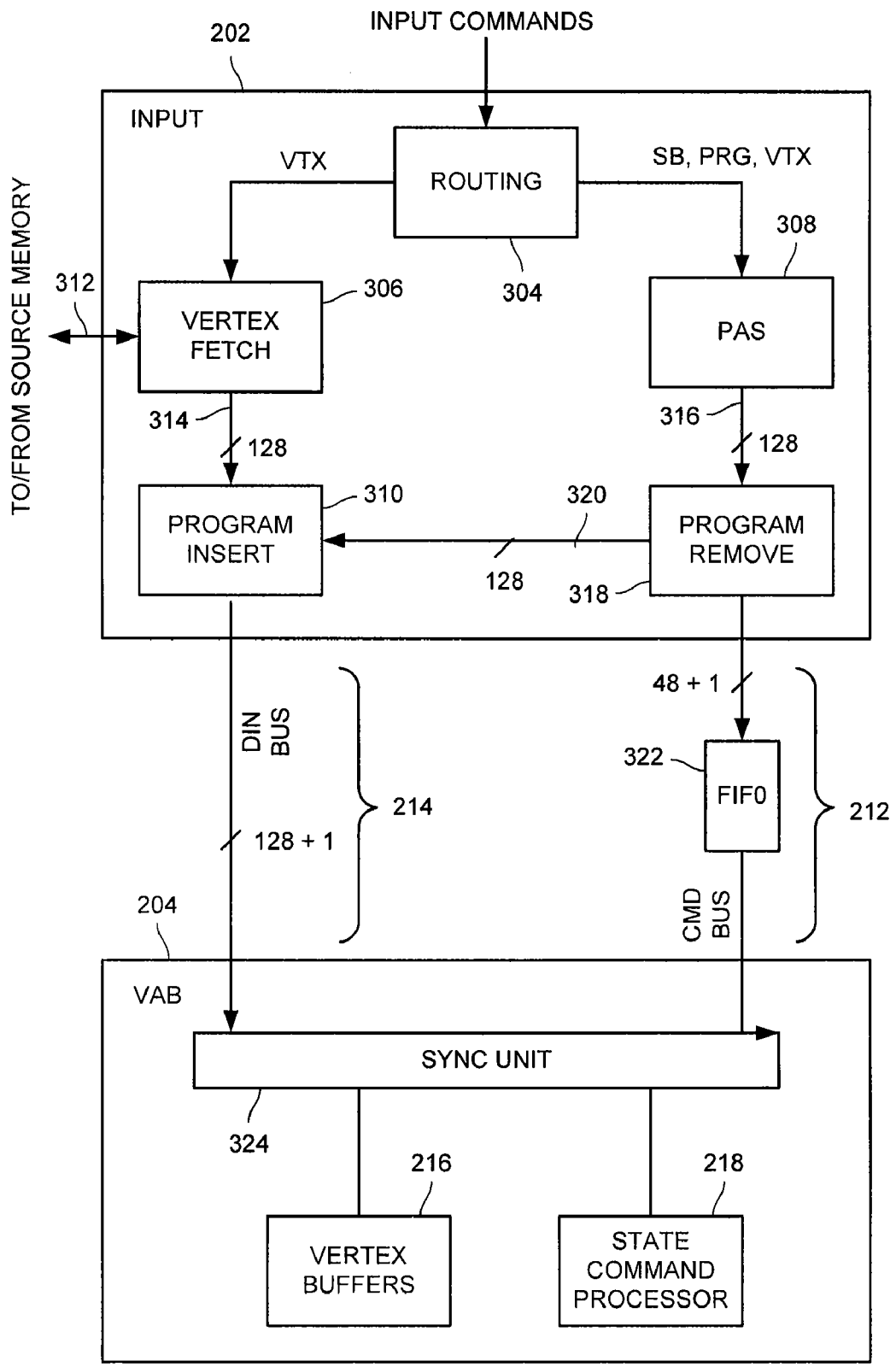
FIG. 3 is a simplified block diagram of an input module and vertex assembly buffer for a rendering pipeline according to an embodiment of the present invention.

Operation of input module 202 and vertex assembly buffer 204 will now be described. FIG. 3 is a simplified block diagram showing further features of input module 202 and vertex assembly buffer 204 according to an embodiment of the present invention. In this embodiment, input module 202 and assembly buffer 204 implement a blocking synchronization scheme using sync tokens to identify the presence of programs in the data stream on DIN bus 214 and to control re-insertion of such programs into the command stream from CMD bus 212.

Input module 202 includes a routing unit 304, a vertex fetch unit 306 that generates the vertex data stream, and a primitive assembly and state (PAS) unit 308 that generates the state command stream. Rerouting of programs from the state command stream to the data stream is provided by a program removal unit 318 and a program insertion unit 310.

In operation, routing unit 304 receives the input command stream (e.g., from command buffer 128 of FIG. 1) and routes each command to vertex fetch unit 306 or primitive assembly and state unit 308. Commands routed to vertex fetch unit 306 advantageously include various vertex fetching commands, denoted herein by "VTX." Each VTX command identifies one or more vertices to be obtained from a source memory (not shown), which may be, e.g., system memory 104 or graphics memory 116 of FIG. 1. Vertex fetch unit 306, which may be of generally conventional design, processes such commands by sending read requests to the source memory via a memory interface path 312, receiving the requested vertex data via interface path 312, and forwarding the received vertex data as a vertex stream on an output path 314. The vertex data forwarded on output path 314 may include any or all of the vertex data received from memory and may also include other information, e.g., an identifier of which one of vertex buffers 216 is to be used for storing the fetched vertex. Output path 314 is advantageously wide enough (e.g., 128 bits) to transfer all of the data for one vertex attribute in one cycle. The present description refers to output path 314 as carrying vertices, but it is to be understood that on any given cycle, output path 314 may be carrying an attribute of a vertex rather than all of the data for the vertex. Where vertices have multiple attributes, a vertex may be transferred over multiple cycles with the data transmitted during each cycle also including appropriate identifiers for where the data is to be stored.

In some embodiments, vertex fetch unit 306 is configured to detect duplicate or redundant VTX commands and to avoid duplicative fetches or data transfers. Thus, a VTX command may result in zero or more read requests on interface line 312 and zero or more vertices being added to the vertex stream on output path 314.

In some embodiments, vertex fetch unit 306 operates with variable latency. For example, in system 100 (FIG. 1), if data for a requested vertex has been cached locally to graphics processing subsystem 112, response time may be faster than if access to system memory 104 is required. It is to be understood that vertex fetch unit 306 establishes the order of vertices in the vertex data stream by the order in which vertices are forwarded on output path 314. In some embodiments, this order might or might not correspond to the order in which the vertices were requested. For instance, if a vertex from a later request is returned to vertex fetch unit 306 before a vertex from an earlier request, vertex fetch unit 306 might be configured to forward the later vertex onto output path 314 without waiting for completion of the earlier request. In other embodiments, the order of vertices on output path 314 matches the order of requests made by vertex fetch unit 306.

Commands routed to PAS unit 308 include various state commands or state bundles (denoted herein by "SB") for configuring downstream components. PAS unit 308, which may also be of generally conventional design, is configured to forward the state commands SB as a command stream on an output path 316. In accordance with an embodiment of the present invention, at least one of the commands routed to PAS unit 308 corresponds to a program (denoted herein by "PRG") that is to be executed by a downstream component of rendering pipeline 200 (FIG. 2), and PAS unit 308 also forwards such programs as part of the command stream on output path 316. In some embodiments, the program PRG is included in the input command stream. In other embodiments, the input command stream may include an instruction for obtaining the program from a cache (or other storage), in which case PAS unit 308 is advantageously configured to fetch the program from the cache and add it to the command stream on output path 316.

In some embodiments, PAS unit 308 also receives VTX commands and assembles zero or more primitives based on the vertices identified by each VTX command. For each assembled primitive, PAS unit 308 generates a corresponding "PRIM" command that enables downstream components to identify the primitive. Each PRIM command is also added to the command stream on output path 316. Primitive assembly may be performed and PRIM commands implemented using conventional techniques, and a detailed description is omitted.

Thus, PAS unit 308 generates a (state) command stream on output path 316. PAS unit 308 is advantageously configured such that the order in which state commands are forwarded to output path 316 corresponds to the order of the input commands. For instance, any PRIM commands generated in response to a particular VTX instruction are placed into the state command stream in the position corresponding to that VTX instruction in the input stream. Similarly, any programs that are fetched in response to an input "program fetch" instruction are placed into the state command stream at the position corresponding to that "program fetch" instruction in the input stream. Output path 316 may be wide enough (e.g., 128 bits) to accommodate a program or a reasonably large portion of a program in parallel; longer programs may be forwarded to output path 316 over multiple consecutive cycles.

Before the data and command streams are sent to DIN bus 214 and CMD bus 212, any programs are rerouted from the command stream to the data stream. Specifically, the command stream on output path 316 is received by program removal unit 318. Program removal unit 318 detects any programs in the command stream on output path 316 and removes each program from the command stream, replacing the removed program with appropriate sync tokens to indicate the point from which it was removed. The removed program is forwarded via a rerouting path 320 to program insertion unit 310 for insertion into the data stream, while the rest of the command stream (including the sync tokens) is forwarded to CMD bus 212.

The sync tokens used for CMD bus 212 may take various forms. In one embodiment, a synchronization bit is added to each command placed on CMD bus 212; e.g., if the command size is 48 bits, bus 212 may be 49 bits wide. The synchronization bit is advantageously asserted (e.g., set to "1") for the last command before the point where a program was removed and for the first command following the program, and deasserted (e.g., set to "0") for all other commands. In this embodiment, the sync token is considered to be present when the synchronization bit is asserted and absent otherwise. In another embodiment, the sync token might be implemented by defining a "SYNC" command and inserting the SYNC command into the command stream on CMD bus 212 between the last command before the program and the first command after it.

Program insertion unit 310 is configured to insert programs that were removed from the command stream into the data stream on DIN bus 214 and to insert appropriate sync tokens into the data stream to identify such programs. More specifically, program insertion unit 310 receives vertices via output path 314 and programs to be inserted via rerouting path 320. As long as a program is not present on rerouting path 320, program insertion unit 310 forwards the vertices from output path 314 onto DIN bus 214. When a program is present on rerouting path 320, program insertion unit 310 inserts the program between two vertices and inserts sync tokens to indicate the presence of the program.

The sync tokens used for DIN bus 214 may also take various forms. In one embodiment, the sync token consists of a synchronization bit added to each entry placed on DIN bus 214; thus, if the vertex size is 128 bits, bus 214 may be 128+1 bits wide. The synchronization bit is advantageously asserted (e.g., set to "1") for the last vertex before the point where a program is inserted and for the last program segment to be inserted, and deasserted (e.g., set to "0") for all other data elements on DIN bus 214. As in the case of CMD bus 212, the sync token is considered to be present when the synchronization bit is asserted and absent otherwise. Alternatively, the sync token might be implemented by defining a "sync" flag and inserting one sync flag into the data stream on DIN bus 214 before the beginning of the program and another after the end of the program.

DIN bus 214 transfers the data stream (including any rerouted programs that were inserted by program insertion unit 310 and associated sync tokens) to vertex assembly buffer 204. Concurrently, CMD bus 212 transfers the command stream (minus any rerouted programs and including associated sync tokens provided by program removal block 318) to vertex assembly buffer 204. DIN bus 214 and CMD bus 212 may have any desired configuration, and either bus may or may not include buffers, delay circuits, or the like. Each bus 212, 214 advantageously includes control circuitry (not shown) configured to exert appropriate back pressure on upstream components—e.g., allowing new entries to accumulate at the input side of the bus or preventing upstream components from operating to obtain new data—in the event that the output side is paused. The buses and any associated control circuitry can be of generally conventional design.

Each bus may have any desired configuration, and the configuration may be adapted to optimize delivery of the command and data streams for a particular embodiment. For example, in one embodiment, CMD bus 212 may be paused relatively often, e.g., due to command execution that requires a pipeline flush during which new state information should not be processed, while DIN bus 214 is paused relatively rarely, e.g., because there are a large number of vertex buffers 216 to which vertices can be delivered. In this embodiment, CMD bus 212 advantageously includes a FIFO (first-in, first-out) circuit 322 that allows commands to accumulate while the DIN bus 214 does not include a corresponding FIFO. The two buses generally operate asynchronously; that is, there is no guaranteed time relationship between delivery of a given vertex via DIN bus 214 and delivery of a given command via CMD bus 212.

Vertex assembly buffer 204 handles the data stream and command stream in parallel as they are received, routing vertices to vertex buffers 216 and commands (including programs) to state command processor 218. In order to re-insert any rerouted programs received via DIN bus 214 into the command stream received via CMD bus 212, vertex assembly buffer 204 advantageously includes a sync unit 324 that implements a blocking synchronization and crossover operation between the two buses. Buses 212 and 214 are allowed to operate asynchronously until a sync token is received on one of the buses. At that point, buses 212 and 214 are brought into synchronization and operated in a crossover mode in which a program from DIN bus 212 is routed to state command processor 218. Once routing of the program is complete, buses 212 and 214 are returned to normal, asynchronous operation.

Figure 4:
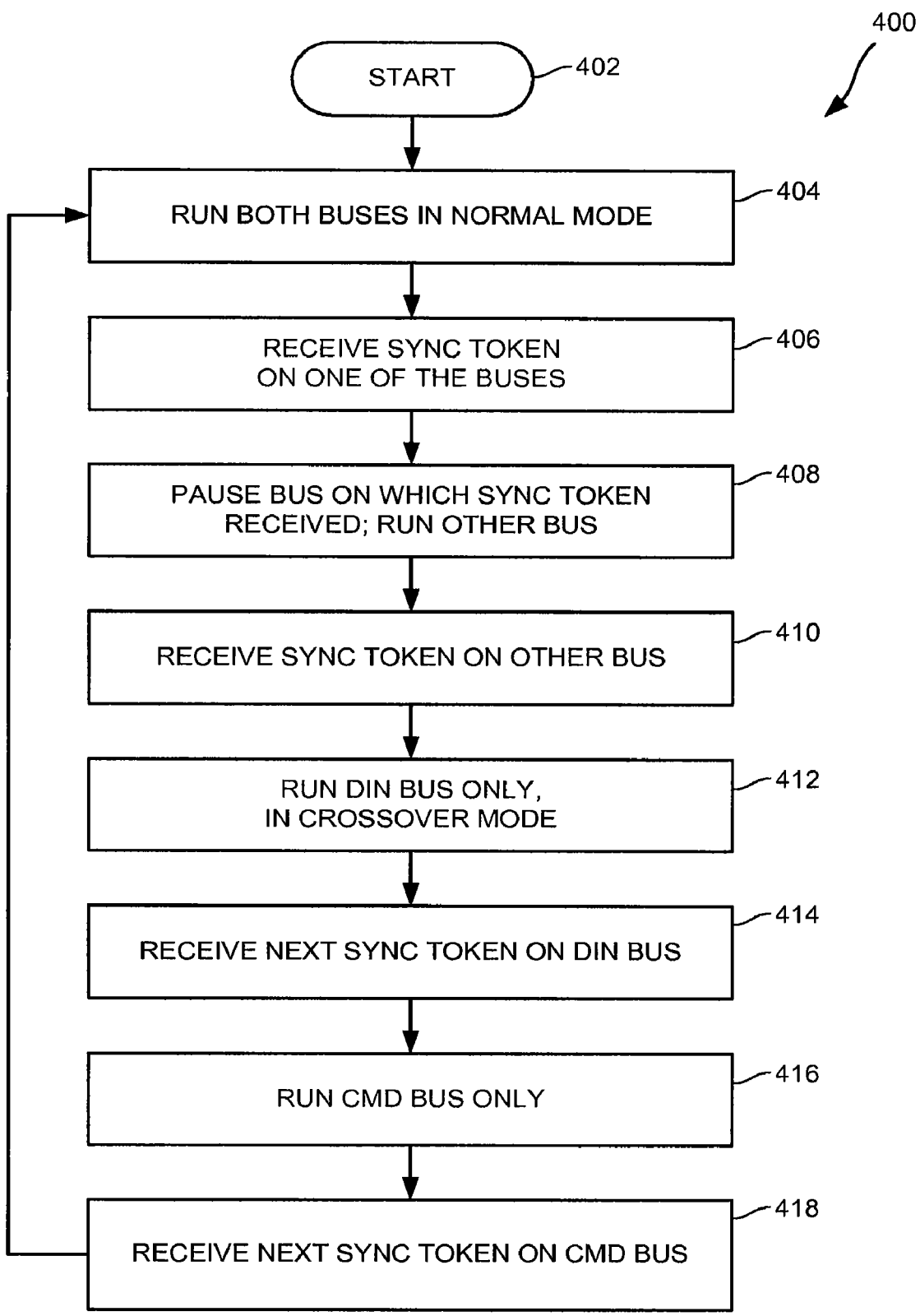
FIG. 4 is a flow diagram of a process for reinserting a program in a command stream according to an embodiment of the present invention.

More specifically, FIG. 4 is a flow diagram of a process 400 for reinserting programs from DIN bus 214 into the command stream from CMD bus 212 that may be implemented in sync unit 324. After device startup (step 402), DIN bus 214 and CMD bus 212 run asynchronously in a "normal" mode (step 404), with data from DIN bus 214 (vertices) being routed to vertex buffers 216 and commands from CMD bus 212 being routed to state command processor 218. Normal operation continues until a sync token is received on one of the buses (step 406). At that point, the two buses are brought into synchronization by pausing the bus on which the sync token was received while continuing to run the other bus (step 408) until a sync token is detected on the other bus (step 410).

Upon receipt of the second sync token at step 410, DIN bus 214 is ready to deliver a rerouted program to the command stream, and CMD bus 212 is now at the point where the rerouted program should be reinserted. Accordingly, at step 412, process 400 enters a "crossover" operating mode in which CMD bus 212 is paused while DIN bus 214 runs, with the incoming data being routed to state command processor 218. Crossover-mode operation continues until the next sync token is detected on DIN bus 214 (step 414), signifying the end of the program. At that point, a "recovery" mode is entered; DIN bus 214 is paused and CMD bus 212 runs (step 416) until the next sync token is detected on CMD bus 212 (step 418). Thereafter, process 400 returns to the normal mode (step 404).

It will be appreciated that the process described herein is illustrative and that variations and modifications are possible. Steps described as sequential may be executed in parallel, order of steps may be varied, and steps may be modified or combined. It should be noted that the crossover and recovery periods can each be made to last as many cycles as desired. In particular, where the sync tokens on the command stream come in pairs bracketing an insertion point as described above, the recovery mode will generally not last more than one cycle.

Figure 5:
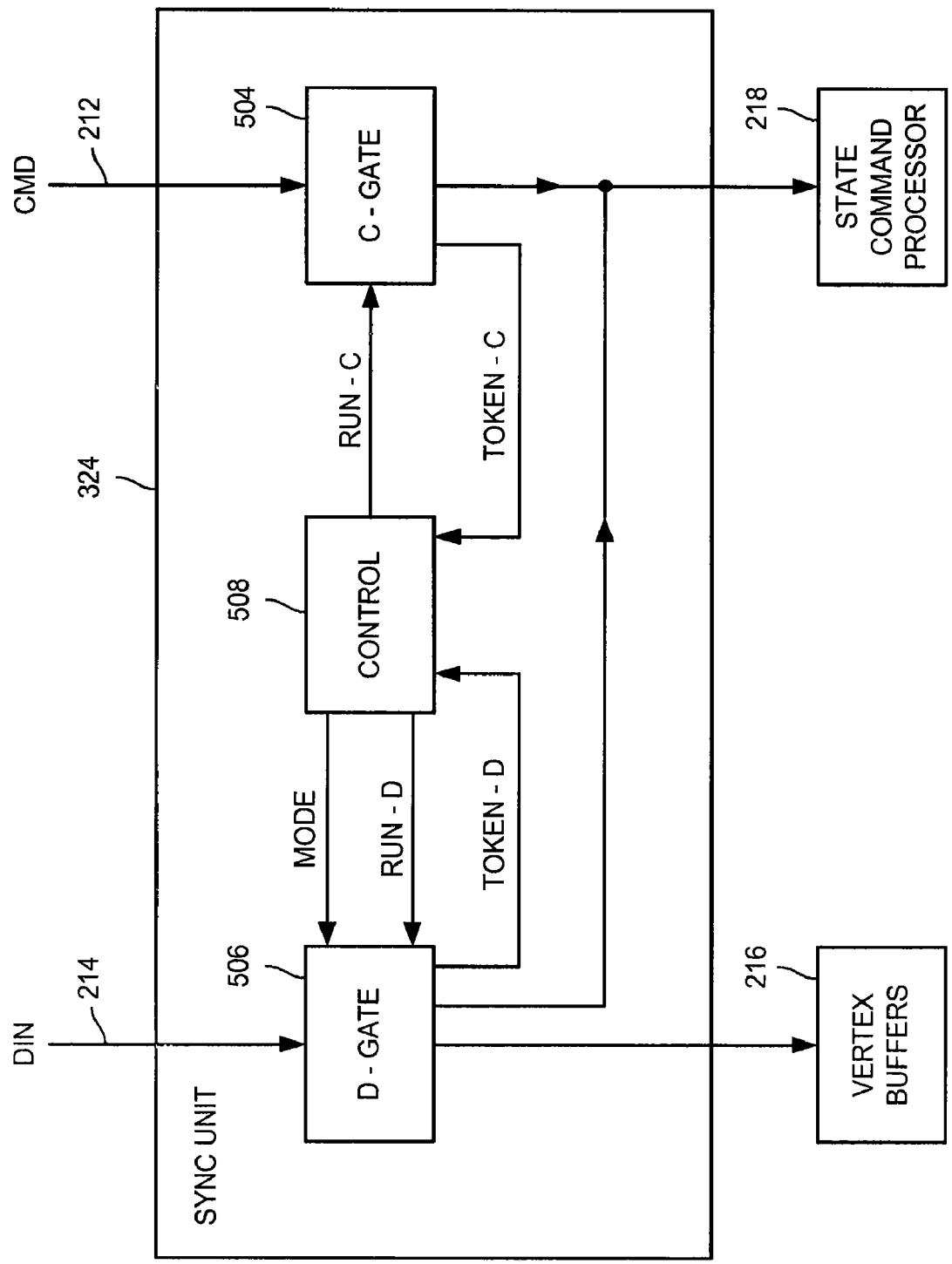
FIG. 5 is a simplified block diagram of a synchronization unit for performing the process of FIG. 4 according to an embodiment of the present invention.

FIG. 5 is a simplified block diagram of an embodiment of sync unit 324 that implements process 400. Sync unit 324 has a command stream gate circuit (C-gate) 504, a data stream gate circuit (D-gate) 506, and a control circuit 508.

C-gate 504 is configured to receive an activation (run_C) signal from control circuit 508. When the run_C signal is asserted, C-gate 504 forwards commands received from CMD bus 212 to state command processor 218; when the run_C signal is not asserted, C-gate 504 pauses CMD bus 212, holding the current command for subsequent delivery. C-gate 504 is also configured to detect sync tokens on CMD bus 212 and to send a token signal (token_C) to control circuit 508 when a token is detected. For instance, where the sync token is implemented using a synchronization bit, as described above, C-gate 504 may simply forward the synchronization bit.

D-gate 506 is configured to receive an activation (run_D) signal and a mode signal from control circuit 508. The mode signal advantageously has two states corresponding to the normal mode and the crossover mode described above. When the run_D signal is asserted, D-gate 506 forwards data received from DIN bus 214 to a destination selected according to the mode signal: in normal mode, D-gate 506 forwards the data to vertex buffers 216, and in crossover mode, D-gate 506 forwards the data to state command processor 218. When the run_D signal is not asserted, D-gate 506 pauses DIN bus 214, holding the current data for subsequent delivery. D-gate 506 is also configured to detect sync tokens on DIN bus 214 and to send a token signal (token_D) to control unit 508 when a token is detected (e.g., by forwarding a sync bit carried on DIN bus 214).

Control circuit 508 receives the token_D and token_C signals from D-gate 506 and C-gate 504, respectively. In normal mode, as long as neither of the token signals is asserted, control circuit 508 continues to assert both the run_C and run_D signals, with the mode signal in its "normal" state. If C-gate 504 asserts the token_C signal while both run_C and run_D signals are asserted, control circuit 508 deasserts the run_C signal, pausing only C-gate 504, until such time as D-gate 506 asserts the token_D signal. Similarly, if D-gate 506 asserts the token_D signal while both run_C and run_D signals are asserted, control circuit 508 deasserts the run_D signal, pausing only D-gate 506, until such time as C-gate 504 asserts the token_C signal.

Once both token signals have been asserted, control circuit 508 initiates the crossover mode by asserting the run_D signal, deasserting the run_C signal, and setting the mode signal to its "crossover" state. In this configuration, C-gate 504 is paused, and D-gate 506 forwards data to state command processor 218. Crossover-mode operation continues until D-gate 506 again asserts the token_D signal. At that point, control circuit 508 initiates the recovery mode by asserting the run_C signal and deasserting the run_D signal. Recovery-mode operation continues until C-gate 504 again asserts the token_C signal. Control circuit 508 then resets the mode signal to the normal state and asserts the run_D signal, returning to the normal operating mode. It will be appreciated that different control circuitry may also be used to implement process 400.

FIGS. 6A-E illustrate, via specific command and data sequences, how the insertion of sync tokens into the data and command streams by input unit 202 as described above results in correct (in-order) re-insertion of programs into the command stream by sync unit 324. In FIGS. 6A-E, types of commands and data are indicated generically by a label and a sequential numerical index that distinguishes different instances of the same type of command or data. Thus, label "SB" indicates a state command of normal width, "VTX" indicates a vertex fetch command as described above, "PRG" indicates a program (or any other state command of extended width), and "PRIM" indicates a primitive command that may be generated from a VTX command as described above. Vertex data for a single vertex is indicated by "VDAT" with a numerical index reflecting the order in which vertices were provided by vertex fetch unit 306.

FIG. 6A illustrates an input command sequence 602 that might be received by routing unit 304 of input unit 202. FIG. 6B illustrates a command stream 604 that may be generated by PAS unit 308 in response to input command sequence 602, with command PRIM1 (PRIM2) in stream 604 being generated in response to command VTX1 (VTX2) in stream 602. It is to be understood that any number of PRIM commands may be generated in response to a VTX command, and the one-to-one correspondence shown here is simply for convenience of illustration.

FIG. 6C illustrates a vertex data stream 606 that may be generated by vertex fetch unit 306 in response to input command sequence 602. As described above, any number of vertices (VDAT) may be fetched in response to one VTX command, and the association between vertices and VTX commands is not significant for the present embodiment. For instance, vertex VDAT1 might or might not be fetched in response to command VTX1.

Command stream 604 (FIG. 6B) passes through program removal block 318, which removes the programs and appends a sync token to the commands immediately preceding and immediately following each removed program. The resulting command stream 608, as it might be received at sync unit 324, is shown in FIG. 6D. In stream 608, command SB1 is followed by command PRIM1. Command PRIM1 carries a sync token (indicated by "SYNC") because the next three commands in stream 604 are programs (PRG1, PRG2, PRG3) that are removed and rerouted to the data stream by program removal unit 318 and program insertion unit 310. The next command SB2 in stream 608 carries a sync token to indicate the end of the group of rerouted programs. Command SB3 in stream 608 also carries a sync token because the next command (PRG4) in stream 604 is another program that is removed and rerouted; the next command PRIM2 carries the sync token indicating the end of the removed program.

The programs PRG1-4 that are removed from command stream 604 are inserted into data stream 606 (FIG. 6C) by program insertion block 310. The position of program insertion into data stream 606 is based on when the rerouted programs are received at program insertion block 310. A resulting data stream that might be received at sync unit 324 is shown as DIN stream 610 in FIG. 6D. The first group of programs PRG1, PRG2, PRG3 is inserted as a group between vertices VDAT1 and VDAT2. Vertex VDAT1 carries a sync token to indicate that what follows is a program. Since programs PRG1, PRG2, PRG3, occupy consecutive positions in command stream 604, they are advantageously kept together in DIN stream 610 and marked by one pair of sync tokens so that they can be re-inserted into consecutive locations in the command stream. Thus, only the last program PRG3 in the group carries a sync token. Similarly, the remaining program PRG4 is inserted between vertices VDAT2 and VDAT3; vertex VDAT2 carries a sync token to indicate that what follows is a program, and program PRG4 carries a sync token to indicate that it is the end of its program group. It is to be understood that the programs PRG1-4 could be inserted at any point in data stream 606.

FIG. 6D illustrates a relative timing that might occur between CMD stream 608 and DIN stream 610 as received at sync unit 324, with time running along the horizontal axis. As described above, sync unit 324 reinserts the rerouted programs from DIN stream 610 into CMD stream 608 by reference to the sync tokens. FIG. 6E illustrates an output stream 612 to state command processor 218 and an output stream 614 to vertex buffers 216 that may be generated by sync unit 324 in response to the streams shown in FIG. 6D, again with relative timing. For purposes of illustration, it is assumed that CMD bus 212 and DIN bus 214 are both synchronized to a processor cycle (e.g., using a clock), and cycles are denoted by T1, T2, etc.

Initially, both CMD bus 212 and DIN bus 214 are active (running). During a first cycle (T1), command SB1 from CMD stream 608 is forwarded to state command processor 218 and vertex VDAT1 from DIN stream 610 is forwarded to vertex buffers 216. The sync token in DIN stream 610 pauses the DIN stream, so that during the next cycle (T2), only command PRIM1 from CMD stream 608 is forwarded. The sync token in CMD stream 608 during cycle T2 causes the crossover mode to start. Accordingly, during cycle T3, program PRG1 is forwarded from DIN stream 610 to state command processor 218 while CMD stream 608 is paused. During the next two cycles (T4, T5), programs PRG2 and PRG3 are forwarded to state command processor 218. The sync token accompanying program PRG3 is detected during cycle T5 and initiates the recovery mode. In cycle T6, CMD stream 608 resumes with forwarding of command SB2 to state command processor 218 while DIN stream 610 is paused. The sync token accompanying command SB2 restores the normal mode; during cycle T7, command SB3 is forwarded to state command processor 218 while vertex VDAT2 is forwarded to vertex buffers 216.

Command SB3 and vertex VDAT2 are each accompanied by a sync token. Accordingly, the crossover mode is entered again, and during the next cycle (T8), program PRG4 is forwarded from DIN stream 610 to state command processor 218. The sync token accompanying program PRG4 initiates the recovery mode; during cycle T9, command PRIM2 from CMD stream 608 is forwarded to state command processor 218 while DIN stream 610 is paused. The sync token accompanying command PRIM2 restores the normal mode; during cycle T10, vertex VDAT3 is forwarded from DIN stream 610 to vertex buffers 216 while a next command (not shown) may be forwarded from CMD stream 608 to state command processor 218.

It will be appreciated that the processing example shown in FIGS. 6A-E is illustrative and that variations and modifications are possible. The command and/or data sequences may be varied from those shown without limitation. The location of the sync tokens may be different from that shown (e.g., they may occupy separate slots or be paired with different commands and/or data as described above). Depending on the frequency with which commands are received and/or vertices are fetched, the command and/or data buses may include idle cycles (e.g., no-ops), and a sync token may be transferred on either bus during an otherwise idle cycle. In addition, it is not necessary that the command and data buses operate at the same rate in the normal mode; a sync token for initiating crossover mode may appear on one bus any number of cycles before the corresponding token appears on the other bus. In crossover mode, only one bus is active, and the active bus may operate at its normal rate or at the rate of the other bus as desired.

It is also to be understood that crossover mode is not limited to handling programs. For instance, any state command that is too wide for CMD bus 212 may be rerouted to DIN bus 214 by program removal unit 318 and program insertion unit 310, then reinserted into the command stream by sync unit 324.

Persons of ordinary skill in the art will recognize that although FIG. 6 may suggest that crossover mode can delay vertex transfer, any such delays need not significantly affect throughput of the rendering pipeline. In general, any delay in vertex transfer introduced by the crossover mode will depend on various factors including the frequency of occurrence of programs (or other wide commands) that would be transferred via the DIN bus and the fraction of cycles during which vertex data is actually being transferred. In addition, the timing of vertex fetch commands can be controlled such that, even in the presence of transfer delays, most or all vertices reach the vertex buffers before they are needed by downstream components. Thus, any delay in vertex transfer caused by switchover mode operation need not reduce overall throughput of the rendering pipeline. It should also be noted that because the data path is generally separate from the command path, vertex transfer can often continue even when the command path is stalled (e.g., during a pipeline flush as described above).

The data transfer system and method described herein enable an efficient transfer of vertex data and state commands between rendering pipeline components. A relatively wide data bus and a relatively narrow command bus are operated in parallel. Much of the command stream is transferred via the command bus, with any commands that are too wide for the command bus (such as programs) being rerouted onto the data bus. The rerouted commands can be reinserted in the command stream by providing a crossover mode in which data from the data bus is forwarded into the command path rather than the data path. Prior to entering crossover mode, the buses are advantageously synchronized so that the rerouted commands are reinserted at the appropriate point in the command stream, allowing the order of state commands to be preserved. Accordingly, it is possible to largely separate the data stream from the command stream, thereby reducing stalling of the data path while providing an efficient path for transferring a stream of state commands that includes wide commands (e.g., programs).

While the invention has been described with respect to specific embodiments, one skilled in the art will recognize that numerous modifications are possible. For instance, the sync token can be implemented in a variety of ways. In one alternative embodiment, distinct tokens for signaling the beginning and end of crossover mode may be used; such "begin" and "end" tokens might both be included in the same bus cycle. In another embodiment, some of the tokens described herein need not be used. For example, a rerouted program is to be reinserted into the command stream between two consecutive commands; accordingly, just one sync token might be used in the command stream to indicate the insertion point. In still another embodiment, additional tokens might be used; for instance, each program inserted into the vertex data stream might include a sync token.

In yet another embodiment, the sync tokens are inserted in separate bus cycles between data or commands. More generally, any implementation of sync tokens may be used, provided that the implementation supports identification of a point in the command stream at which content from the data stream is to be inserted and identification of the content in the data stream that is to be inserted into the command stream at that point.

In addition, persons of ordinary skill in the art will recognize that the two buses need not be used to carry commands and data respectively. The synchronization techniques described herein can be adapted to any situation where two different data streams are delivered in parallel on two different buses and it is desirable on occasion to use a first one of the buses for delivering a portion of the second data stream. Although particular data sizes and bus widths have been mentioned herein for illustrative purposes, it should be understood that the configuration of the buses and data streams may be varied without limitation.

Further modifications in which the second bus can also be used to deliver a portion of the first data stream will also be apparent in view of the foregoing disclosure. For instance, in the embodiment described above, after a sync token is received on each bus, the data bus runs in crossover mode (with the command bus being paused) until the next sync token on the data bus is received, at which point the command bus runs in a recovery mode (with the data bus being paused) until the next sync token on the command bus is received. By modifying the recovery mode such that data received on the command bus during recovery mode is forwarded into the data path and by suitably arranging sync tokens in the two streams, it would also be possible to leverage the command bus to deliver a portion of the data stream.

Thus, although the invention has been described with respect to specific embodiments, it will be appreciated that the invention is intended to cover all modifications and equivalents within the scope of the following claims.

What is claimed is:

1. A device for transferring a first data stream having a plurality of first data elements and a second data stream having a plurality of second data elements to a first data path and a second data path, respectively, the device comprising:

an input rerouting circuit configured to modify the first and second data streams by rerouting one of the second data elements from the second data stream into the first data stream and inserting a placeholder token into the second data stream, the placeholder token identifying a sequential position of the rerouted data element;

a first bus coupled to the input rerouting circuit and configured to transfer to a destination node the modified first data stream including the rerouted data element;

a second bus coupled to the input rerouting circuit and configured to transfer to a destination node the modified second data stream including the placeholder token; and a receiving circuit coupled to the respective destination nodes of the first bus and the second bus, wherein the receiving circuit is configured to reinsert the rerouted data element from the modified first data stream into the modified second data stream at the sequential position identified by the placeholder token and to deliver the first data stream to the first data path and the second data stream, including the rerouted data element, to the second data path.

2. The device of claim 1, wherein the first bus has a first width, the second bus has a second width less than the first width, and the rerouted data element has a third width, the third width being greater than the second width.

3. The device of claim 1, wherein the placeholder token is appended to one of the second data elements in the second data stream that is sequentially adjacent to the rerouted data element.

4. The device of claim 1, wherein the input rerouting circuit is further configured to insert a rerouting token into the first data stream, the rerouting token identifying a location of the rerouted data element within the modified first data stream.

5. The device of claim 4, wherein the rerouting token is appended to a data element in the modified first data stream that is sequentially adjacent to the rerouted data element.

6. The device of claim 4, wherein the receiving circuit is further configured to operate in any one of a plurality of modes, the plurality of modes including a normal mode and a crossover mode, wherein, in the normal mode, data elements received at the destination node of the first bus are delivered to the first data path and data elements received at the destination node of the second bus are delivered to the second data path, and wherein, in the crossover mode, data elements received at the destination node of the first bus are delivered to the second data path and data elements received at the destination node of the second bus are held for subsequent delivery.

7. The device of claim 6, wherein the plurality of modes further includes a synchronization mode wherein the modified first data stream and the modified second data stream are brought into synchronization by pausing the second data stream at the placeholder token while continuing to operate the modified first data stream until the rerouting token is detected in the first data stream.

8. The device of claim 7, wherein the receiving circuit is further configured to select a mode from a subset of the plurality of modes, the subset including the normal mode, the crossover mode, and the synchronization mode, in response to the rerouting token and the placeholder token.

9. The device of claim 8, wherein the receiving circuit is further configured to operate in the normal mode until a first one of the rerouting token and the placeholder token is received, thereafter to operate in the synchronization mode until the other of the rerouting token and the placeholder token is received, and thereafter to operate in the crossover mode until the rerouted data element is delivered to the second data path.

10. The device of claim 9, wherein the receiving circuit is further configured to return to normal mode operation after the rerouted data element is delivered to the second data path.

11. A method for transferring a first data stream having a plurality of first data elements and a second data stream having a plurality of second data elements from a source device to a receiving device, the method comprising:

at the source device, modifying the first data stream and the second data stream by rerouting one of the second data elements from the second data stream into the first data stream and inserting into the second data stream a placeholder token identifying a sequential position of the rerouted data element, wherein modifying the first data stream and the second data stream further includes inserting into the first data stream a begin rerouting token and an end rerouting token identifying, respectively, a beginning point and an ending point of the rerouted data element in the modified first data stream;

transferring the modified first data stream on a first bus from the source device to the receiving device;

transferring the modified second data stream on a second bus from the source device to the receiving device; and at the receiving device, reinserting the rerouted data element from the modified first data stream into the modified second data stream at the sequential position indicated by the placeholder token, wherein reinserting the rerouted data elements includes:

concurrently routing data elements received from the first bus into a first data path and data elements received from the second bus into a second data path;

detecting, as a first synchronizing token, either of the placeholder token on the second bus or the begin rerouting token on the first bus;

subsequently to detecting the first synchronizing token, pausing the routing of data elements from the one of the first and second buses on which the first synchronizing token was detected while continuing to route data elements from the other of the first and second buses;

detecting, as a second synchronizing token, the other of the placeholder token on the second bus or the begin rerouting token on the first bus; and subsequently to detecting the second synchronizing token, routing data elements from the first bus into the second data path while holding at the source device data elements from the second bus for later delivery.

12. The method of claim 11, further comprising:

during the act of routing data from the first bus into the second data path, detecting the end rerouting token on the first bus; and subsequently to detecting the end rerouting token, resuming concurrently routing data elements received from the first bus into the first data path and data elements received from the second bus into the second data path.

13. An interface module for delivering state commands and vertex data to a graphics processor, the interface module comprising:

an input circuit coupled to receive an input stream and to generate a vertex stream and a state command stream in response to the input stream, the state command stream including at least one wide command and at least one other command; and a data transfer circuit including a data bus and a command bus, the data transfer circuit being coupled to transfer the vertex stream from the input circuit to a vertex buffer of the graphics processor and to transfer the state command stream from the input circuit to a state command processor of the graphics processor, wherein the data transfer circuit is configured to transfer the vertex stream and the wide command via the data bus and to transfer the other state command via the command bus, wherein the data transfer circuit includes a rerouting circuit configured to modify the vertex stream and the state command stream by rerouting the wide command from the state command stream into the vertex stream and inserting a placeholder token into the state command stream, the placeholder token identifying a sequential position of the rerouted wide command, wherein the modified vertex stream is transferred on the data bus and the modified state command stream is transferred on the command bus, wherein the data transfer circuit further includes a receiving circuit coupled to receive data from the data bus and the command bus, wherein the receiving circuit is configured to reinsert the rerouted wide command from the modified vertex stream into the modified command stream at the sequential position identified by the placeholder token and to deliver the vertex stream to the vertex buffer and the command stream, including the rerouted wide command, to the state command processor, wherein the rerouting circuit is further configured to insert a rerouting token into the modified vertex stream to identify a sequential position of the wide command in the modified vertex stream.

14. The interface module of claim 13, wherein the wide command corresponds to at least a portion of a program to be executed by a programmable processing unit of the graphics processor, wherein the programmable processing unit receives the wide commands from the state command processor via a command data path.

15. The interface module of claim 13, wherein the receiving circuit is further configured to operate in any one of a plurality of modes, the plurality of modes including a normal mode and a crossover mode, wherein, in the normal mode, data elements received from the data bus are delivered to the vertex buffer and data elements received from the command bus are delivered to the state command processor, and wherein, in the crossover mode, data elements received from the data bus are delivered to the state command processor and data elements received from the command bus are held for subsequent delivery.

16. The interface module of claim 15, wherein the plurality of modes further includes a synchronization mode and wherein the modified vertex stream and the modified command stream are brought into synchronization by the receiving circuit where the modified state command stream is paused at the placeholder token while continuing to operate the modified vertex stream until the rerouting token is detected in the modified vertex stream.

17. The interface module of claim 16, wherein the receiving circuit is further configured to select a mode from a subset of the plurality of modes, the subset including the normal mode, the crossover mode, and the synchronization mode, in response to the placeholder token and the rerouting token.

* * * * *